US009836570B1

(12) United States Patent
Azuma et al.

(10) Patent No.: US 9,836,570 B1
(45) Date of Patent: Dec. 5, 2017

(54) SEMICONDUCTOR LAYOUT GENERATION

(71) Applicant: GLOBALFOUNDRIES Inc., Grand Cayman (KY)

(72) Inventors: Atsushi Azuma, Cortlandt Manor, NY (US); Yuping Cui, Fishkill, NY (US); James A. Culp, New Paltz, NY (US); Marco Facchini, Wappingers Falls, NY (US); Shaoning Yao, Wappingers Falls, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 15/173,756

(22) Filed: Jun. 6, 2016

(51) Int. Cl.
*G06F 17/50* (2006.01)

(52) U.S. Cl.
CPC ...... *G06F 17/5072* (2013.01); *G06F 17/5081* (2013.01)

(58) Field of Classification Search
CPC .......................... G06F 17/5072; G06F 17/5081
USPC ........................................................ 716/112
See application file for complete search history.

(56) References Cited

U.S. PATENT DOCUMENTS

| 6,948,141 | B1* | 9/2005 | Satya | G01R 31/318364 716/136 |
| 7,448,018 | B2 | 11/2008 | Heng et al. | |
| 8,176,461 | B1* | 5/2012 | Trimberger | G06F 17/5036 703/19 |
| 2011/0288671 | A1 | 11/2011 | Agarwal | |
| 2015/0286772 | A1* | 10/2015 | Donnelly | G06F 17/5072 716/112 |
| 2017/0083654 | A1* | 3/2017 | Chuang | G06F 17/5081 |
| 2017/0098028 | A1* | 4/2017 | Donnelly | G06F 17/5081 |

OTHER PUBLICATIONS

Hibbeler, et al., "Moving Carefully Towards Model-based Layout Optimization and Checking", IEEE/SEMI Advanced Semiconductor Manufacturing Conference (ASMC 2007), Jun. 2007, pp. 24-28, IEEE.org (online), DOI: 10.1109/ASMC.2007.375074.
Paek, et al., "Enhanced Layout Optimization of Sub-45nm Standard, Memory Cells and Its Effects", SPIE Proceedings vol. 7275: Design for Manufacturability through Design-Process Integration III, Mar. 2009, 9 pages, SPIE.org (online), DOI: 10.1117/12.815413.

* cited by examiner

*Primary Examiner* — Suchin Parihar
(74) *Attorney, Agent, or Firm* — DeLio, Peterson & Curcio, LLC; Kelly M. Nowak

(57) ABSTRACT

Semiconductor layout generation includes: calculating, for a design rule constraint, a slack value for a subset of elements of a proposed semiconductor layout; generating a plurality of alternative layouts, where each of the alternative layouts includes a variation of interdependent characteristics of the subset of elements and a slack value for the subset of elements of each of the alternative layouts is less than the calculated slack value of subset of elements of the proposed layout; and calculating, by the layout design module for each of the alternative layouts, a risk value indicating the alternative layout's risk of fabrication failure.

17 Claims, 3 Drawing Sheets

SEMICONDUCTOR LAYOUT GENERATION

BACKGROUND OF THE INVENTION

1. Field of the Invention

The present disclosure is generally related to data processing, or, more specifically, methods, apparatus, and products for semiconductor layout generation.

2. Description of Related Art

Semiconductor circuits are generally brought into existence in two phases. In a first phase the circuit is designed. In a second phase, the circuit is fabricated on a semiconductor die. During the design phase, a circuit designer may create a layout of a circuit on a computer storage device to be used during the fabrication phase to fabricate the circuit on the silicon wafer.

Current methods to ensure that such layout can be fabricated without failure are often inefficient and sub-optimal. For example, the fabrication process may be changed after the circuit design and layout are complete but before fabrication. Thus, the layout, if fabricated as originally designed, would result in sub-optimal yield in semiconductor manufacturing. Also, a layout may be compliant to an individual design rule, but may not yield when multiple fail modes interact with each other. Further, density critical layouts are usually designed sub-ground rules. However, there is no automated way to guide design to minimize overall process fails.

SUMMARY OF THE INVENTION

Methods, apparatus, and products for semiconductor layout generation are disclosed in this specification. Such layout generation may include calculating and evaluating, by a layout design module for a design rule constraint, a slack value for a subset of elements of a proposed semiconductor layout. The elements of the subset have interdependent characteristics for the design rule constraint and the slack value comprises a difference between a maximum value for the design rule constraint and a value of the interdependent characteristics of the subset of elements of the proposed layout.

Such layout generation may also include generating, by the layout design module, a plurality of alternative layout. Each of the alternative layouts includes a variation of the interdependent characteristics of the subset of elements and a slack value for the subset of elements of each of the alternative layouts is less than the calculated slack value of subset of elements of the proposed layout.

Finally, the layout generation may include calculating, by the layout design module for each of the alternative layouts, a risk value indicating the alternative layout's risk of fabrication failure.

The foregoing and other objects, features and advantages described herein will be apparent from the following more particular descriptions of example embodiments as illustrated in the accompanying drawings wherein like reference numbers generally represent like parts of example embodiments.

DESCRIPTION OF THE PREFERRED EMBODIMENT(S)

Figure 1:
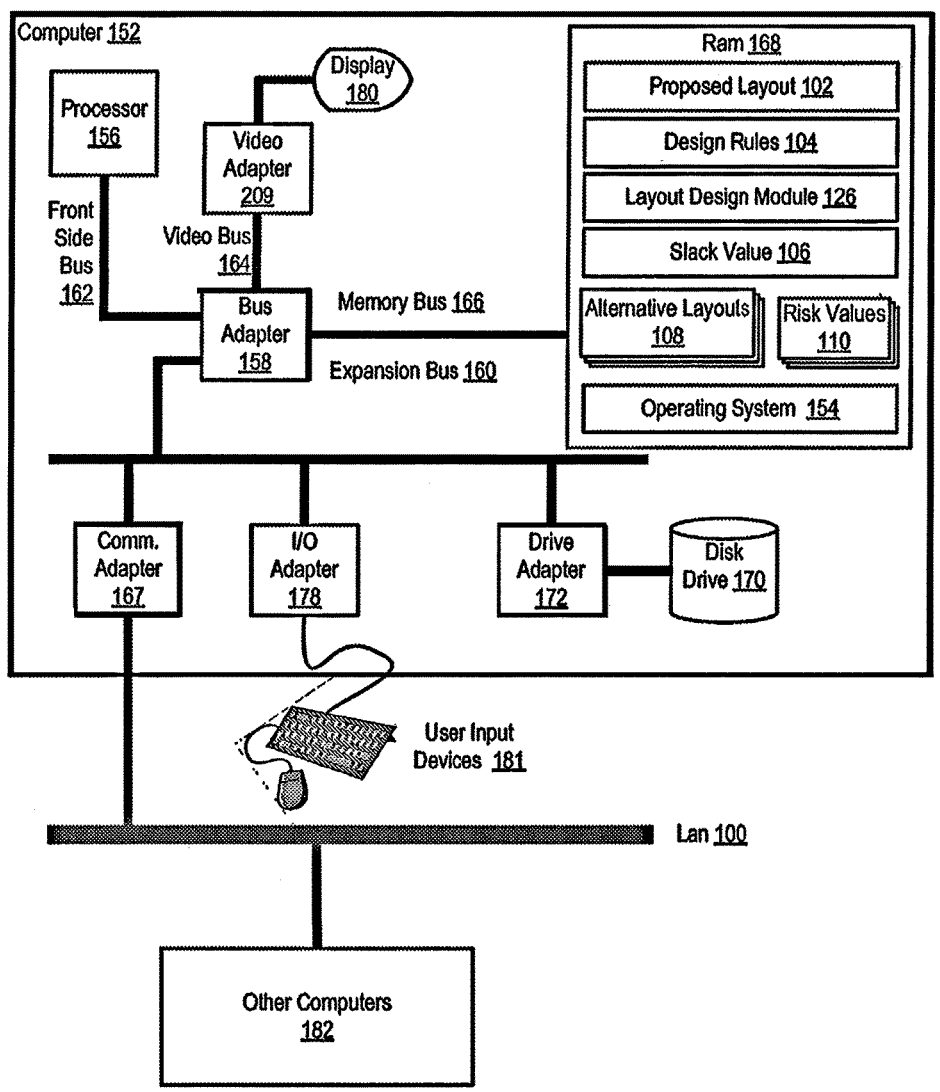
FIG. 1 sets forth a network diagram of a system for semiconductor layout generation according to embodiments described herein.

Example methods, apparatus, and products for semiconductor layout generation in accordance with embodiments are described herein with reference to the accompanying drawings, beginning with FIG. 1. FIG. 1 sets forth a network diagram of a system for semiconductor layout generation according to embodiments described herein. The system of FIG. 1 includes an example of automated computing machinery in the form of a computer (152). The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a layout design module (126), a module of computer program instructions for semiconductor layout generation in accordance with embodiments described herein. A layout, as the term is used here, is a data structure comprising at least a structured description of physical placement and dimensions of circuit elements to be fabricated on a semiconductor die, a structure description of physical placement and dimensions of interconnections of the elements in the form of traces and the like, specifications of materials and related characteristics (depth, thickness, width, height, and the like), and any other descriptions as will occur to readers of skill in the art which may be utilized to fabricate the circuit on the semiconductor die.

The layout design module (126), when executed, may perform a design rule check of a proposed layout (102) in accordance with a plurality of different design rule (104) constraints. A design rule check is a method performed as part of electronic design automation that verifies the physical layout of a particular semiconductor circuit that satisfies a series of recommended parameters called design rules. Design Rules are a series of parameters provided by semiconductor manufacturers that enable the circuit or layout designer to verify the correctness of a mask set. Design rules are specific to a particular semiconductor manufacturing process. A design rule set specifies certain geometric and connectivity restrictions to ensure sufficient margins to account for variability in semiconductor manufacturing processes.

Such performance of a design rule check may include identifying a subset of elements of the proposed layout as elements having one or more interdependent characteristics exceeding a predefined tolerance of a design rule constraint. That is, the layout design module (126) may identify one or more 'pinch points' in which the physical layout of two or more elements increases the risk of manufacturing failure. Interdependent characteristics are characteristics of two elements that may affect one another during the fabrication process. Modifying one characteristic to reduce risk of fabrication failure, for example, may increase the overall risk of fabrication failure due to the characteristic's effect on other characteristics.

The layout design module (126) may also calculate, for a design rule constraint, a slack value (106) for a subset of elements of a proposed semiconductor layout. In the example of FIG. 1, the elements of the subset have interdependent characteristics for the design rule constraint. The slack value is a difference between a maximum value for the design rule constraint and a value of the interdependent characteristics of the subset of elements of the proposed layout. A maximum value for a design rule constraint may be a user specified value or a constraint based on available fabrication processes. Consider, for example, a maximum contacted poly pitch (CPP) of 80 nanometers. Such a constraint is a maximum value that cannot be exceeded due to the fabrication process being employed. The slack value may be the difference between such a maximum allowed CPP of 80 nm and the actual layout usage of the CPP—say 70 nm. In such a case, the slack value is 10 nm for that particular design rule constraint. Such a slack value effectively represents 10 nm of 'slack' in which the physical layout may be modified from the proposed layout and still remain within the maximum design constraints.

The layout design module (126) may also generate a plurality of alternative layouts. Each of the alternative layouts may include a variation of the interdependent (110) characteristics of the subset of elements and a slack value for the subset of elements of each of the alternative layouts is less than the calculated slack value of subset of elements of the proposed layout. That is, each alternative layout may be a layout in which one characteristic is modified at a predefined interval—say, one nanometer for the example CPP constraint above—and the slack value of each alternative layout is less than that of the original. Said another way, the alternative layouts represent layouts that utilize the available 'slack' for that design constraint. Such intervals may be predefined by a user so as to control the number of alternative layouts generated and thus the amount of processing capability required to perform the remaining analysis described below.

The layout design module (126) may then calculate, for each of the alternative layouts, a risk value (110) indicating the alternative layout's risk of fabrication failure. The risk value (110) may be calculated by first, iteratively calculating a design value by varying a process assumption in each iteration. Each varied process assumption is an alternative layout. The calculations may be carried out for a number of iterations until the design rule value exceeds a process fail criterion (the design rule is 'broken'). This iterative calculation may be carried out for all combinations of design rules and process assumptions. Then, for each design rule or for each process assumption, the layout design module may sum the change in process assumptions that caused the design rule to be broken (exceed the process fail criterion). The sum may be used to calculate a percentage relative to other design rule sums. Such a percentage may be the risk value for that particular layout. The layout design module (126) may then sort the alternative layouts by risk value and present an alternative layout having a risk value indicating the lowest risk of fabrication failure.

Also stored in RAM (168) is an operating system (154). Operating systems useful in systems configured for semiconductor layout generation according to embodiments described herein include UNIX™, Linux™, Microsoft XP™, AIX™, IBM's i5/OS™, and others as will occur to those of skill in the art. The operating system (154), layout design module (126), proposed layout (102), design rules (104), slack value (106), alternative layouts (108), and risk values (110), in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for semiconductor layout generation according to embodiments described herein include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for semiconductor layout generation according to embodiments described herein include modems for wired dial-up communications, Ethernet (IEEE 802.3) adapters for wired data communications, and 802.11 adapters for wireless data communications.

The arrangement of servers and other devices making up the exemplary system are for explanation, not for limitation. Data processing systems useful according to various embodiments may include additional servers, routers, other devices, and peer-to-peer architectures, not shown in FIG. 1, as will occur to those of skill in the art. Networks in such data processing systems may support many data communications protocols, including for example, TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments may be implemented on a variety of hardware platforms in addition to those illustrated in FIG. 1.

Figure 2:
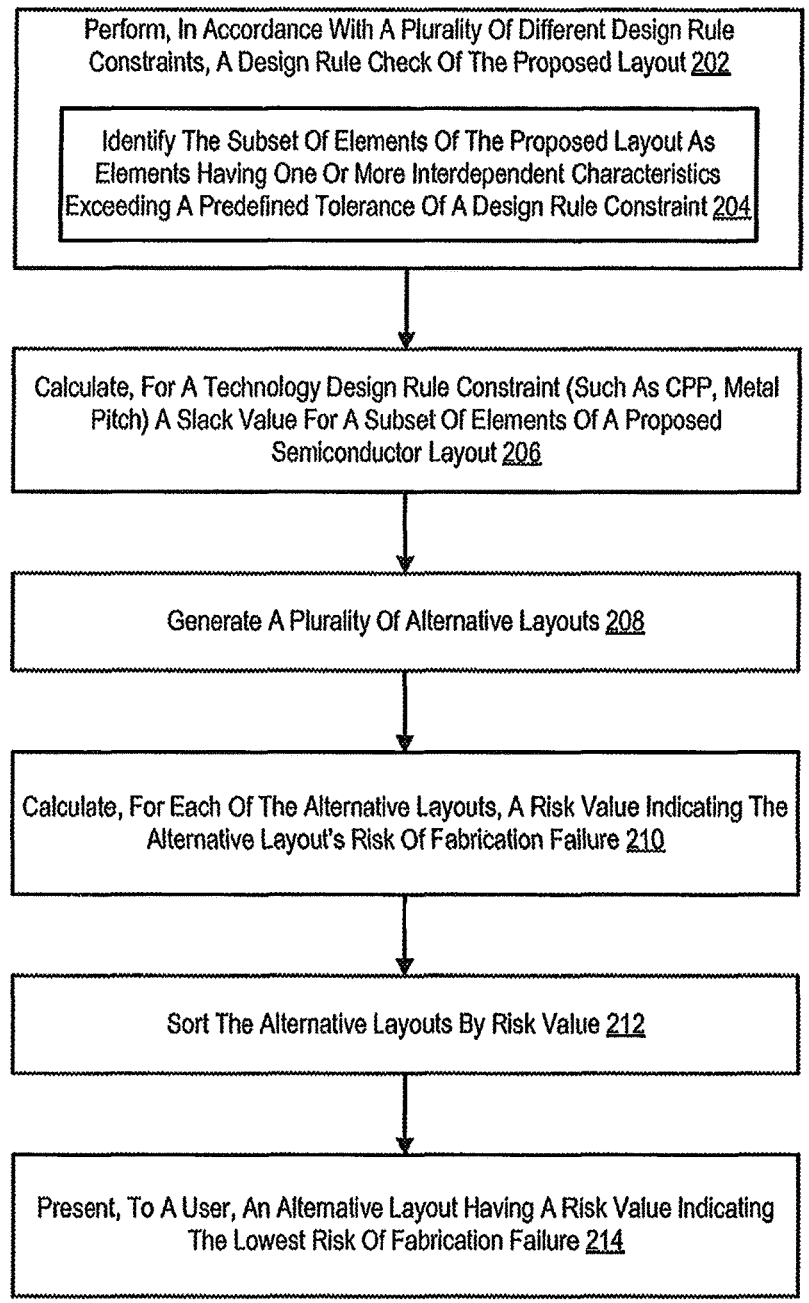
FIG. 2 sets forth a flow chart illustrating an exemplary method for semiconductor layout generation according to embodiments described herein.

For further explanation, FIG. 2 sets forth a flow chart illustrating an exemplary method for semiconductor layout generation according to embodiments described herein. The method of FIG. 2 includes performing (202), by a layout design module in accordance with a plurality of different design rule constraints, a design rule check of the proposed layout. In the method of FIG. 2, performing (202) a desiring rule check includes identifying (204) a subset of elements of a proposed layout as elements having one or more interdependent characteristics exceeding a predefined tolerance of a design rule constraint. Identifying (204) elements having one or more interdependent characteristics exceeding a predefined tolerance of a design rule constraint may be carried out by identifying one or more 'pinch points' in which the physical layout of two or more elements increases the risk of manufacturing failure.

The method of FIG. 2 also includes calculating (206), by a layout design module for a design rule constraint, a slack value for a subset of elements of a proposed semiconductor layout. In the method of FIG. 2, the elements of the subset have interdependent characteristics for the design rule constraint. Also in the method of FIG. 2, the slack value comprises a difference between a maximum value for the design rule constraint and a value of the interdependent characteristics of the subset of elements of the proposed layout. That is, calculating (206) a slack value may be carried out by calculating the difference between a maximum value for the design rule constraint and a value of the interdependent characteristics of the subset of elements of the proposed layout.

The method of FIG. 2 also includes generating (208), by the layout design module, a plurality of alternative layouts. In the method of FIG. 2, each of the alternative layouts includes a variation of the interdependent characteristics of the subset of elements and a slack value for the subset of elements of each of the alternative layouts is less than the calculated slack value of subset of elements of the proposed layout. That is, generating (208) alternative layouts may be carried out by modifying one or more of the interdependent characteristics of the elements and performing a slack calculation to confirm that the slack value of the alternative layout is less than the that of the originally proposed layout. The generation of an alternative layout may be carried out a predefined number of times by modifying the interdependent characteristics by a predefined interval amount.

The method of FIG. 2 also includes calculating (210), by the layout design module for each of the alternative layouts, a risk value indicating the alternative layout's risk of fabrication failure. Calculating a risk value may be carried out as described above with respect to FIG. 1. Essentially, modifying a process assumption for a particular design rule across a range of values so as to break the design rule and determining, for each design rule, possibility of the process assumption variation causing the design rule to break.

The method of FIG. 2 continues by sorting (212), by the layout design module, the alternative layouts by risk value and presenting (214), by the layout design module to a user, an alternative layout having a risk value indicating the lowest risk of fabrication failure.

Readers of skill in the art will recognize that the method of FIG. 2 may be carried out at various times by various entities. For example, the method of FIG. 2 may be carried out at design phase, by a circuit designer, prior to fabrication of the layout on a semiconductor die. Alternatively, the method of FIG. 2 may be carried out by a circuit manufacture at the semiconductor fabrication phase.

Figure 3:
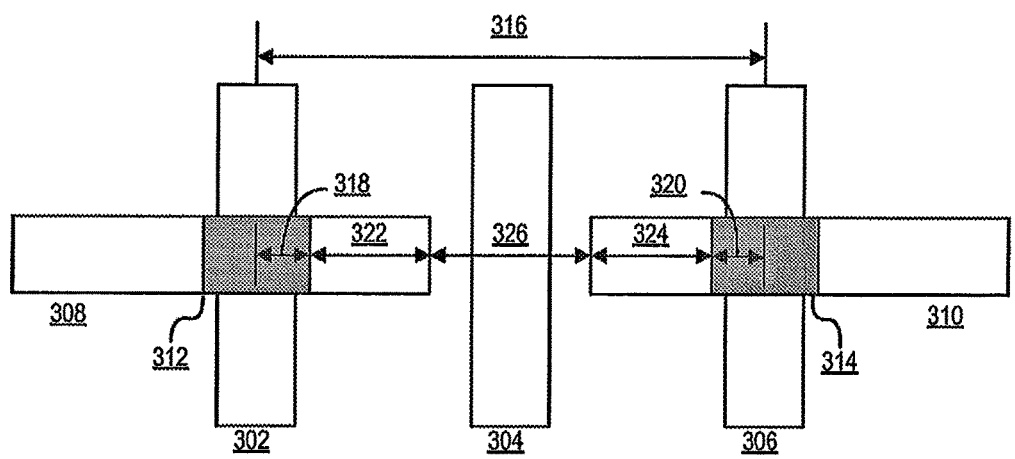
FIG. 3 sets forth an example semiconductor layout which may be generated according to embodiments described herein.

For further explanation, FIG. 3 sets forth an example semiconductor layout which may be generated according to embodiments described herein. The example layout of FIG. 3 includes two metal wires (308, 310) and three gates (302, 304, 306).

There are several design pinch points and design constraints depicted in the example of FIG. 3. For example, the distance (316) between the contacted poly pitch (the gates) is a design constraint which cannot be varied. By contrast, the point-to-point distance (326) between two wires is a pinch point which may be varied by varying the end lengths (322, 324) of the wires. Likewise, the area (318, 320) in which the wires overlap the gates is another pinch point that may be varied. Consider, for example, a proposed layout in which the following values are included for each pinch point and design constraints:
  a. The CPP is 80 nm (316);
  b. Wire overlap past via is 24 nm, with the total being 48 nm (322, 324);
  c. Tip to tip space between wires is 70 nm (326);
  d. Half width of via is 14 nm, with the total being 28 (312, 320).

In such an example, slack value may be calculated by calculating the difference between twice the CPP (160 nm) and the sum of the pinch point values (146 nm: tip space between wires, wire overlap pass via, via width) which results in a total slack value of 14 nm. In essence, the available total slack with which to provide alternative layouts is 14 nm. In each alternative layout, the wire overlap pass via may be increased or decreased and the tip spacing of the wires may be decreased or increased as long as the total slack value for that alternative layout is between zero and 14 nm. Once the alternative layouts are generated, a risk value may be calculated for each, the layouts may be sorted in order of risk, and the layout having the least risk of fabrication failure may be proposed to a user.

Readers of skill in the art will recognize that the various methods, apparatus, and products set forth in the present disclosure may provide a multitude of benefits. Examples of such benefits may include:
  providing a statistical method to reduce the risk of fails caused by fabrication process;
  providing a method of post tapeout/design release layout optimization which supports a fabless use model;
  providing a layout optimization method that minimize design space requirement which is a distinct advantage compared to a typical design-for-manufacture DFM approach; and
  others as will occur to readers of skill in the art.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments without departing from its true spirit.

The descriptions in this specification are for purposes of illustration only and are not to be construed in a limiting sense. The scope of the present disclosure is limited only by the language of the following claims.

The invention claimed is:

1. A method of semiconductor fabrication, the method comprising:
   determining a proposed semiconductor design layout;
   executing a layout design module to perform a design rule check of the proposed semiconductor design layout in accordance with a plurality of different design rule constraints;
   calculating, by the layout design module, an original slack value for a subset of elements of the proposed semiconductor design layout for a design rule constraint of the plurality of different design rule constraints, wherein the elements of the subset have interdependent characteristics for the design rule constraint and the original slack value comprises a difference between a maximum value for the design rule constraint and a value of the interdependent characteristics of the subset of elements of the proposed layout, the original slack value representing an amount physical layout of circuit elements to be fabricated on a semiconductor die may be modified from the proposed semiconductor design layout while remaining within the maximum value for the design rule constraint;
   generating, by the layout design module, a plurality of alternative layouts of the proposed semiconductor design layout by modifying one or more of the interdependent characteristics of the subset of elements and performing slack calculations for each of the plurality of alternative layouts to confirm that slack values of each of the plurality of alternative layouts is less than the calculated original slack value of the proposed semiconductor design layout;

calculating, by the layout design module, a risk value for each of the alternative layouts indicating the alternative layout's risk of fabrication failure; and a user selecting a semiconductor design layout selected from the proposed semiconductor design layout or one of the alternative layouts to reduce risk of semiconductor fabrication failure by ensuring fabrication.

2. The method of claim 1 further comprising:

sorting, by the layout design module, the alternative layouts by risk value; and presenting, by the layout design module to the user, an alternative layout of the plurality of alternative layouts having a risk value indicating the lowest risk of fabrication failure.

3. The method of claim 1, further comprising:

performing, by the layout design module in accordance with the plurality of different design rule constraints, the design rule check of the proposed layout including identifying the subset of elements of the proposed layout as elements having one or more interdependent characteristics exceeding a predefined tolerance of a design rule constraint, whereby the design rule check verifies that physical layout of the proposed semiconductor design satisfies design rules for reducing risk of manufacturing failure.

4. The method of claim 1 wherein calculating the slack value for a subset of elements of a proposed semiconductor layout, generating a plurality of alternative layouts, and calculating a risk value for each of the alternative layouts is carried out during a design phase prior to fabrication.

5. The method of claim 1 wherein calculating the slack value for a subset of elements of a proposed semiconductor layout, generating a plurality of alternative layouts, and calculating a risk value for each of the alternative layouts is carried out during a fabrication phase after a design phase.

6. An apparatus for semiconductor fabrication, the apparatus comprising a computer processor and a computer memory operatively coupled to the computer processor, the computer memory having disposed within it computer program instructions that, when executed, cause the apparatus to carry out the steps of:

receiving input of a proposed semiconductor design layout;

executing a layout design module to perform a design rule check of the proposed semiconductor design layout in accordance with a plurality of different design rule constraints;

calculating, by the layout design module, an original slack value for a subset of elements of the proposed semiconductor design layout for a design rule constraint of the plurality of different design rule constraints, wherein the elements of the subset have interdependent characteristics for the design rule constraint and the original slack value comprises a difference between a maximum value for the design rule constraint and a value of the interdependent characteristics of the subset of elements of the proposed layout, the original slack value representing an amount physical layout of circuit elements to be fabricated on a semiconductor die may be modified from the proposed semiconductor design layout while remaining within the maximum value for the design rule constraint;

generating, by the layout design module, a plurality of alternative layouts of the proposed semiconductor design layout by modifying one or more a variation of the interdependent characteristics of the subset of elements and performing slack calculations for each of the plurality of alternative layouts to confirm that slack values of each of the plurality of alternative layouts is less than the calculated original slack value of the proposed semiconductor design layout;

calculating, by the layout design module, a risk value for each of the alternative layouts indicating the alternative layout's risk of fabrication failure; and a user selecting a semiconductor design layout selected from the proposed semiconductor design layout or one of the alternative layouts to reduce the risk of semiconductor fabrication failure by ensuring fabrication.

7. The apparatus of claim 6 further comprising computer program instructions that, when executed, cause the apparatus to carry out the steps of:

sorting, by the layout design module, the alternative layouts by risk value; and presenting, by the layout design module to the user, an alternative layout of the plurality of alternative layouts having a risk value indicating the lowest risk of fabrication failure.

8. The apparatus of claim 6, further comprising computer program instructions that, when executed, cause the apparatus to carry out the steps of:

performing, by the layout design module in accordance with the plurality of different design rule constraints, the design rule check of the proposed layout including identifying the subset of elements of the proposed layout as elements having one or more interdependent characteristics exceeding a predefined tolerance of a design rule constraint, whereby the design rule check verifies that physical layout of the proposed semiconductor design satisfies design rules for reducing risk of manufacturing failure.

9. The apparatus of claim 6 wherein calculating the slack value for a subset of elements of a proposed semiconductor layout, generating a plurality of alternative layouts, and calculating a risk value for each of the alternative layouts is carried out during a design phase prior to fabrication.

10. The apparatus of claim 6 wherein calculating the slack value for a subset of elements of a proposed semiconductor layout, generating a plurality of alternative layouts, and calculating a risk value for each of the alternative layouts is carried out during a fabrication phase after a design phase.

11. A computer program product for semiconductor layout generation, the computer program product disposed upon a computer readable storage medium, the computer program product comprising computer program instructions capable, when executed, of causing a computer to carry out the steps of:

receiving input of a proposed semiconductor design layout;

executing a layout design module to perform a design rule check of the proposed semiconductor design layout in accordance with a plurality of different design rule constraints;

calculating, by the layout design module, an original slack value for a subset of elements of the proposed semiconductor design layout for a design rule constraint of the plurality of different design rule constraints, wherein the elements of the subset have interdependent characteristics for the design rule constraint and the original slack value comprises a difference between a maximum value for the design rule constraint and a value of the interdependent characteristics of the subset of elements of the proposed layout, the original slack value representing an amount physical layout of circuit elements to be fabricated on a semiconductor die may be modified from the proposed semiconductor design layout while remaining within the maximum value for the design rule constraint;

generating, by the layout design module, a plurality of alternative layouts of the proposed semiconductor design layout by modifying one or more a variation of the interdependent characteristics of the subset of elements and performing slack calculations for each of the plurality of alternative layouts to confirm that slack values of each of the plurality of alternative layouts is less than the calculated original slack value of the proposed semiconductor design layout;

calculating, by the layout design module, a risk value for each of the alternative layouts indicating the alternative layout's risk of fabrication failure; and a user selecting a semiconductor design layout selected from the proposed semiconductor design layout or one of the alternative layouts to reduce the risk of semiconductor fabrication failure by ensuring fabrication, failure.

12. The computer program product of claim 11 further comprising computer program instructions that, when executed, cause the computer to carry out the steps of:

sorting, by the layout design module, the alternative layouts by risk value; and presenting, by the layout design module to the user, an alternative layout of the plurality of alternative layouts having a risk value indicating the lowest risk of fabrication failure.

13. The computer program product of claim 11, further comprising computer program instructions that; when executed, cause the computer to carry out the steps of:

performing, by the layout design module in accordance with the plurality of different design rule constraints, the design rule check of the proposed layout including identifying the subset of elements of the proposed layout as elements having one or more interdependent characteristics exceeding a predefined tolerance of a design rule constraint, whereby the design rule check verifies that physical layout of the proposed semiconductor design satisfies design rules for reducing risk of manufacturing failure.

14. The computer program product of claim 11 wherein calculating the slack value for a subset of elements of a proposed semiconductor layout, generating a plurality of alternative layouts, and calculating a risk value for each of the alternative layouts is carried out during a design phase prior to fabrication.

15. The computer program product of claim 11 wherein calculating the slack value for a subset of elements of a proposed semiconductor layout, generating a plurality of alternative layouts, and calculating a risk value for each of the alternative layouts is carried out during a fabrication phase after a design phase.

16. The computer program product of claim 11 wherein the computer readable medium comprises a recordable medium.

17. The computer program product of claim 11 wherein the computer readable medium comprises a transmission medium.

* * * * *